United States Patent Office 2,986,555
Patented May 30, 1961

2,986,555

PROCESS OF HALOGENATING UNSATURATED COMPOUNDS AND HALOGENATED ADDUCTS PRODUCED THEREBY

Laurene O. Paterson, Adrian, Mich., assignor to Drug Research, Inc., Adrian, Mich., a corporation of Michigan No Drawing. Filed May 24, 1955, Ser. No. 510,869

14 Claims. (Cl. 260—82.3)

This invention relates to new compositions of matter and processes for preparing the same. More particularly, it pertains to the formation of halogenated adducts at the site of double bonds in olefinic compounds by the use of N-halogenated compounds containing both bromine and chlorine, and is a continuation-in-part of my copending application, Serial No. 438,633, filed June 22, 1954, now United States Patent No. 2,779,764.

The two halogens may be provided in the form of a mixture of N,N-dibromo- and N,N-dichloro-5-substituted hydantoins, or preferably by the use of N,N-dihalogenated-5-substituted hydantoins containing both bromine and chlorine as active components in the same molecule. In accordance with the process described in my copending application, Serial No. 438,633, N-bromo-N-chloro-5-substituted hydantoins having the following general formula have been produced:

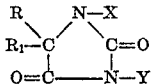

where R may represent a hydrogen atom and $R_1$ a lower aliphatic or aromatic radical, or R and $R_1$ may represent the same or different aliphatic or aromatic radicals, and X and Y may represent either bromine or chlorine, these halogens being different in a given molecule.

The introduction of polar groups such as the halogens bromine and chlorine, carbonyl and imino groups impart desired properties to various substances. Butyl rubber, for example, being a straight, substantially saturated chain, and of low polarity is not compatible with other types of rubber. Butyl rubber, in addition, has poor adhesion for polar surfaces. Furthermore, the presence of halogen in the reacted butyl rubber permits a neoprene-type of vulcanization with this rubber which may ordinarily be vulcanized only with great difficulty.

Typical reactions involving adduct formation using N,N-dihalogenated hydantoins might possibly proceed as follows:

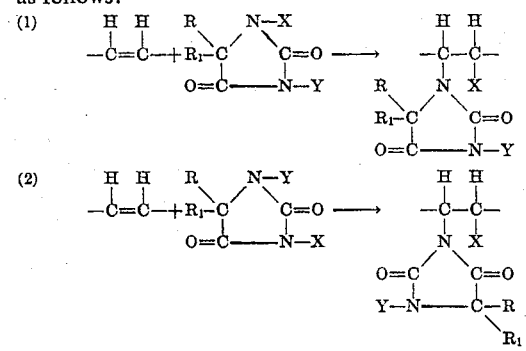

The N-halogen atom Y might add to a double bond of another olefinic molecule to provide cross-linking, or alternately might substitute in the same or a second molecule of the unsaturated compound. It can be realized that the mechanisms and the products of such a reaction might be numerous, and a theoretical explanation of chemical structure is thus far uncertain.

N - bromo-acetamide, N-bromo-phthalimide and N-bromo-succinimide are presently being used as halogenating agents. These mono-N-halogenated compounds do not add to the double bonds of olefinic compounds but have been shown to substitute halogen allylic to a double bond. (Djerassi, Chem. Reviews, 43, 271, 1948.)

Orazi (Anales Assoc. Quim. Argentina, 37, 192, 1949; ibid., 38, 5, 1950) describes a series of experiments wherein he reacted a variety of unsaturated compounds with monobromo- and N,N-dibromo dimethyl hydantoin to yield brominated cyclohexenes.

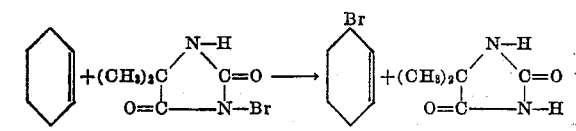

Again, the double bond was not attacked to any appreciable extent and, in fact, little adduct formation could have taken place since the dimethyl hydantoin was recovered almost quantitatively from the reaction mixture.

Although N,N-dichloro dimethyl hydantoin has been known for many years, the reaction of this compound with olefins is nonspecific and leads to a variety of products depending on the reacting conditions.

In the past, efforts have been made to produce halogenated adducts by the use of N-halo compounds. In Ber. 26, 426 (1893) Seliwanow made an unsuccessful attempt to add N-halo imides to unsaturated compounds. Kharash (Journal of the American Chemical Society, 61, 3425, 1929) did succeed in forming adducts by reacting the N-bromo derivatives of sulfonamides with vinyl chloride and styrene, but was unable to obtain addition products with N-brominated nitrogen compounds other than the sulfonamides.

In accordance with the disclosure hereinafter to be made, it has been found that N,N-dihalogenated-5-substituted hydantoins containing both chlorine and bromine, or equimolar mixtures of N,N-dichloro- and N,N-dibromo-5-substituted hydantoins react with olefins readily to produce the desired adducts in high yield.

It is one of the objects of the present invention, therefore, to prepare partly or completely saturated organic compounds from compounds of an olefinic nature, or at least containing double bonds, by treatment thereof with N,N-dihalogenated-5-substituted hydantoins containing both chlorine and bromine.

It has also been found that when N,N-dichloro- and N,N-dibromo-5-substituted hydantoins are intimately mixed the chlorine and bromine migrate to assume the configuration characteristic of the N-chloro-N-bromo-5-substituted hydantoins.

Therefore, it is another object of this invention to prepare partly or completely saturated organic compounds from compounds of an olefinic nature, or at least containing double bonds, by treatment thereof with a mixture of N,N-dichloro- and N,N-dibromo-5-substituted hydantoins.

It is a further object of the invention to provide methods for the production of such halogenated adducts, which adducts have valuable properties in the surface coating, plastic and elastomer fields.

Other objects will become more evident from the further description which follows.

To illustrate the effect of the presence of both chlorine and bromine in adduct formation, a series of experiments was conducted using N,N-dibromo dimethyl hydantoin, N,N-dichloro dimethyl hydantoin, N-bromo-N-chloro dimethyl hydantoin and an equimolar mixture of the N,N-dibromo and N,N-dichloro compounds. Among the unsaturates studied, vinyl acetate and styrene, commonly used in the plastics industry, represent olefins containing no replaceable allylic hydrogen. Cyclohexene, methyl oleate, linseed oil and GR–S rubber, on the other hand, contain allylic hydrogens on both sides of the double bonds. The results of these experiments are listed in the subjoined table.

Since the iodine number is an indication of the degree of unsaturation of a compound, it would be expected that a decrease in the iodine number of such unsaturates after reaction with the N,N-dihalogenated compounds would indicate adduct formation, and, indeed, where such lowering was pronounced, the halogenated adduct could usually be isolated in good yield. It is known, however, that substitution of a halogen or other strongly polar group in an olefinic molecule, particularly on an olefinic carbon, may lead to low iodine values. Where such low values for the iodine number were encountered and substitution suspected, the weight of the recovered dimethyl hydantoin was the determining factor in deciding whether adduct formation had taken place.

The initial degree of unsaturation of each of the olefins listed in the table is given by the iodine number. This was determined by Wijs method. In a typical experiment, 0.1 mol of the unsaturated compound was reacted in 50 cc. of carbon tetrachloride with 0.05 mol of the various N,N-dihalogenated dimethyl hydantoins. In all cases the amount of N-halogenated carrier used was based on the iodine numbers as found. Reaction was initiated by heating on a water bath and, after the initial boiling had subsided, refluxing was continued for one hour. The reaction mixtures were allowed to stand over night. Where the reaction with the halogenated carrier was incomplete or where the dimethyl hydantoin itself precipitated out, the undissolved material was filtered off, dried, weighed and assayed for halogen content.

It will be noted that the decrease in iodine numbers was most pronounced with N-bromo-N-chloro dimethyl hydantoin and with the mixture of the N,N-dichloro and N,N,-dibromo dimethyl hydantoin. Adduct formation was confirmed in these cases since only trace amounts of halogenated carrier and/or dimethyl hydantoin were recovered from the reaction mixture. When used alone, N,N-dibromo and N,N-dichloro dimethyl hydantoin failed to react to any appreciable extent with olefins which did not contain a replaceable allylic hydrogen, and the unreacted halogenated carrier was recovered almost quantitatively. N,N-dibromo dimethyl hydantoin reacted violently with unsaturates containing replaceable allylic hydrogen. Excessive darkening and decomposition of the olefin occurred in several such cases. Dehydrobromination was also indicated by the release of free HBr.

Where multi-olefinic compounds, such as linseed oil and rubber, were reacted with N,N-dihalogenated dimethyl hydantoins, the resultant iodine values were in all cases lower. This might indicate that the desired adduct had been formed even with the dichloro and dibromo compounds when used separately. It will be noted, however, that with these latter carriers, recovery of dimethyl hydantoin was substantial.

TABLE

| Halogen Carrier (0.05 mol used) | Iodine Number after Reaction | Dimethyl Hydantoin Recovered, percent | Unreacted Halogen, percent |
| --- | --- | --- | --- |
| STYRENE–IODINE NUMBER 238 | | | |
| N-Br-N-Br-DMH | 205 | 93 | 65 |
| N-Cl-N-Cl-DMH | 210 | 94 | 90 |
| N-Cl-N-Br-DMH | 81 | trace | 10 |
| N-Cl-N-Cl-DMH+N-Br-N-Br-DMH | 100 | 4 | 13 |
| VINYL ACETATE–IODINE NUMBER 272 | | | |
| N-Br-N-Br-DMH | 262 | 92 | 93 |
| N-Cl-N-Cl-DMH | 232 | 71 | 91 |
| N-Cl-N-Br-DMH | 136 | trace | 2 |
| N-Cl-N-Cl-DMH+N-Br-N-Br-DMH | 117 | 2 | 4.2 |
| CYCLOHEXENE–IODINE NUMBER 299 | | | |
| N-Br-N-Br-DMH | 194 | 83 | 3 |
| N-Cl-N-Cl-DMH | 147 | 54 | 16 |
| N-Cl-N-Br-DMH | 80 | trace | 10 |
| N-Cl-N-Cl-DMH+N-Br-N-Br-DMH | 109 | 6 | 8 |
| METHYL OLEATE–IODINE NUMBER 86 | | | |
| N-Br-N-Br-DMH | 85 | 91.5 | 6 |
| N-Cl-N-Cl-DMH | 70 | 72 | 16 |
| N-Cl-N-Br-DMH | 16 | 4 | 14 |
| N-Cl-N-Cl-DMH+N-Br-N-Br-DMH | 19 | 6.2 | 16 |
| LINSEED OIL–IODINE NUMBER 174 | | | |
| N-Br-N-Br-DMH | 119 | 86 | None |
| N-Cl-N-Cl-DMH | 95 | 43 | 2 |
| N-Cl-N-Br-DMH | 73 | None | 1.5 |
| N-Cl-N-Cl-DMH+N-Br-N-Br-DMH | 71 | None | 3 |
| GR–S RUBBER–IODINE NUMBER 254 | | | |
| N-Br-N-Br-DMH | 202 | 89 | 2 |
| N-Cl-N-Cl-DMH | 197 | 71 | 6 |
| N-Cl-N-Br-DMH | 83 | trace | 6 |
| N-Cl-N-Cl-DMH+N-Br-N-Br-DMH | 86 | trace | 10 |

All of the admixtures of N,N-dichloro and N,N-dibromo hydantoin were utilized in equimolar quantities of 0.025 mole of each carrier.

An attempt was made to establish the structural units of the halogenated adducts which make these adducts more desirable for certain purposes than the original unsaturates. The addition products of the reactions with N-bromo-N-chloro dimethyl hydantoin were isolated and dried. These were subjected to infrared analyses. In each case, significant concentrations of residual N—H, C=O, C—Cl, and C—Br radicals were indicated in the end products. Where styrene served as the olefin, beta bromo styrene was also isolated. If an allylic hydrogen exists, as in cyclohexene, it is thought that the substitutions accompanying adduct formation took place allylic to the double bond.

From the foregoing, it is apparent that the invention finds applications in modifying monomeric and polymeric substances. The introduction of the imide and carbonyl radicals and the halogen into the unsaturate is of prime importance. The resultant increased polarity of the molecules provides improved adhesion to polar surfaces, and also enhances their compatibility with other polar substances. The introduction of the halogen into olefinic compositions also facilitates cross-linking by metal oxide systems.

More specifically, the following broad classes of materials have been advantageously treated with N-bromo-N-chloro-5-substituted hydantoins or mixtures of N,N-dibromo- and N,N-dichloro-5-substituted hydantoins for certain applications: (1) unsaturated aliphatic hydrocarbons, such as low molecular weight polyisobutylene, the tetrapropylenes, and higher boiling petroleum unsaturated mixtures; (2) unsaturated fatty acids; (3) unsaturated fatty acid esters of alcohols, glycols and polyhydric alcohols; (4) unsaturated alkyd resins and oil-modified alkyd resins; (5) butadiene-styrene copolymers, as for example, GR–S rubber; (6) iso-olefin-diolefin interpolymers, as for example, butyl rubber; (7) unsaturated nitriles-diolefin interpolymers, as for example, Buna N; (8) natural rubber, gutta percha, balata and chicle; and (9) unsaturated monomers.

In general, it has been found that relatively low percentages of the N-chloro-N-bromo-5-substituted hydantoins may be reacted with unsaturates to impart to the olefinic system the desired chemical and physical properties. The following specific examples illustrate methods of manufacture and amounts of the halogenated carrier which have proven satisfactory for some applications. It is understood, however, that the requirements for a particular application of an unsaturate may vary widely and that the amount of the N-chloro-N-bromo-5-substituted hydantoin which might be reacted is limited only by the degree of unsaturation of the olefinic compound or mixture. Since the potential number of compositions included in the above classes could be many, only one typical unsaturated system was selected from each.

Example 1

One hundred pounds of an aromatic-type olefinic liquid hydrocarbon as obtained from petroleum fractions and having a boiling range of 450° to 560° C. were intimately mixed with 10 pounds of N-chloro-N-bromo dimethyl hydantoin. The mixture was heated during agitation to 90° C. for 20 minutes. The reaction product was cooled. It contained 4.5 percent total halogen.

Example 2

Five parts of N-chloro-N-bromo diphenyl hydantoin were reacted with 100 parts of oleic acid with agitation at 80° C. for 20 minutes to effect adduct formation. The modified fatty acid was cooled. Upon infrared analysis, the product showed significant concentrations of free —NH radicals.

Example 3

Five parts of N-bromo-N-chloro-5-ethyl-5-methyl hydantoin were reacted with 100 parts of linseed oil with agitation at 90° C. for 15 minutes to effect adduct formation. The modified oil was cooled. By infrared analysis it showed significant concentrations of —NH radicals. Tests indicated accelerated drying and improved flexibility of the resultant film.

Example 4

Six parts of N-bromo-N-chloro dimethyl hydantoin were reacted with 100 pounds of 50 percent solution of a modified alkyd resin containing 40 percent soya oil at 90° C. for 20 minutes. The resultant product contained 2.8 percent total halogen.

Example 5

One hundred grams of a short oil alkyd resin prepared by reacting 225 parts of linseed oil fatty acids, 48 parts of glycerol, 58 parts of pentaerythritol and 148 parts of phthalic anhydride were dissolved in 100 grams of methyl chloroform. To this was added 3.5 grams of N-dibromo and 2.5 grams of N-dichloro dimethyl hydantoin, the mixture raised to 60° C. and reacted to the disappearance of free halogen.

Example 6

One pound of N-chloro-N-bromo dimethyl hydantoin was added to 20 pounds of isobutylene-butadiene copolymer on a rubber mill. The heat generated was sufficient to cause complete reaction of the halogenated carrier with the copolymer. The resultant butyl rubber showed enhanced adhering properties and lent itself to vulcanization by metal oxide systems.

Example 7

Twenty parts of GR–S rubber were dissolved in methyl chloroform and treated with one part of N-chloro-N-bromo dimethyl hydantoin at 60° C. until all the halogen had been taken up. This modified synthetic rubber is suitable for inclusion in rubber cements due to its improved tack and adhesion properties over that of unmodified GR–S.

Example 8

Twenty pounds of natural rubber were broken down on a rubber mill and 2 parts of N-chloro-N-bromo dimethyl hydantoin folded in at about 40° C. The milled rubber contained halogen corresponding to theoretical amounts. After vulcanization, using typical components, such as zinc oxide, stearic acid, sulfur and anti-oxidants, test sample showed improved solvent and oil resistance, and superior tensile properties.

Example 9

Twenty pounds of Buna N rubber were broken down on a cold rubber mill. The mill was then allowed to heat up to about 40° C. and 1.2 pounds of N-chloro-N-bromo diethyl hydantoin were folded in. After the usual compounding agents had been incorporated, the resultant vulcanizate showed improved flexibility and building tack.

Where equimolar mixtures of the N,N-dichloro- and the N,N-dibromo-5-substituted hydantoins are used, these two halogenated carriers should be premixed as thoroughly as possible. It has been found that, in the presence of solvents or during the intimate mixing preceding reaction with the unsaturate, the chlorine and bromine migrate to assume the configuration characteristic of N-chloro-N-bromo-5-substituted hydantoin. Usually, the reaction when using N,N-dibromo- and N,N-dichloro-5-substituted hydantoins in admixture is not as specific in the formation of the desired adduct as with the 5-substituted hydantoins containing both chlorine and bromine as components of the same molecule.

Although an attempt has been made to distinguish by broad classification unsaturates which lend themselves to treatment, the modified reaction products all show in common desirable properties dependent upon the introduction of the hydantoin ring and the halogen. It is apparent, therefore, that many unsaturated systems not specifically mentioned may be reacted in the described manner.

In addition, although the N-halogenated dimethyl hydantoins have been specifically demonstrated to enhance adduct formation, this invention includes the use of any N-halogenated 5-substituted hydantoin where such 5-substituent does not interfere with the halogenation.

While the 5-dimethyl N-halogenated hydantoin has been used in the experiments set forth in the table, it is to be understood that the invention is not limited to the methyl compound, but may include hydantoins substituted by other radicals such as lower aliphatic and aromatic radicals containing from 1 to 10 carbon atoms.

I claim:

1. An adduct of a 1,3-N,N'-bromo-chloro-5-hydrocarbon substituted hydantoin with an ethylenic double bond of an organic compound having olefinic unsaturation, said ethylenic double bond being halogenable by Wijs iodine chloride reagent, said organic olefinic unsaturated compound being selected from the group consisting of a petroleum fraction containing olefinic unsaturation and consisting essentially of an aromatic olefinic liquid petroleum fraction having an approximate boiling point in the range of about 450 to 560° C., a vinyl benzene, cyclohexene, vinyl acetate, methyl oleate, linseed oil, soya oil, oleic acid, linseed oil fatty acids, the reaction product of a polycarboxylic acid and a polyhydric alcohol, a butadiene-styrene copolymer, a lower monoisoolefine-diolefine copolymer, a lower unsaturated nitrile-diolefine copolymer and a natural rubber.

2. The composition of matter recited in claim 1 wherein the hydantoin is N-chloro-N-bromo-5,5-dimethyl hydantoin.

3. The composition of matter recited in claim 1 wherein the hydantoin is N-chloro-N-bromo-5,5-diphenyl hydantoin.

4. The composition of matter recited in claim 1 wherein the hydantoin is N-chloro-N-bromo-5-ethyl-5-methyl hydantoin.

5. The composition of matter recited in claim 1 wherein the hydantoin is N-chloro-N-bromo-5,5-diethyl hydantoin.

6. An adduct of a 1,3-N,N' bromo chloro 5-hydrocarbon substituted hydantoin with an ethylenic double bond of a petroleum fraction having residual olefinic unsaturation, said petroleum fraction consisting essentially of an aromatic olefinic liquid petroleum fraction having an approximate boiling point in the range of about 450–560° C.

7. An adduct of a 1,3-N,N' bromo chloro 5-hydrocarbon substituted hydantoin with an ethylenic double bond of the reaction product of a polycarboxylic acid and a polyhydric alcohol.

8. An adduct of a 1,3-N,N' bromo chloro 5-hydrocarbon substituted hydantoin with an ethylenic double bond of a lower mono-iso-olefine-diolefine copolymer.

9. An adduct of a 1,3-N,N' bromo chloro 5-hydrocarbon substituted hydantoin with an ethylenic double bond of a butadiene-styrene copolymer.

10. An adduct of a 1,3-N,N' bromo chloro 5-hydrocarbon substituted hydantoin with an ethylenic double bond of a natural rubber.

11. An adduct of a 1,3-N,N' bromo chloro 5-hydrocarbon substituted hydantoin with an ethylenic double bond of a lower unsaturated nitrile-diolefine copolymer.

12. The adduct as defined in claim 8 wherein the hydantoin is 1,3-N,N' bromo chloro 5,5-dimethyl hydantoin.

13. The process of producing an adduct with an ethylenic double bond of an organic compound having olefinic unsaturation, said ethylenic double bond being halogenable by Wijs iodine chloride reagent, said organic olefinic unsaturated compound being selected from the group consisting of a petroleum fraction containing olefinic unsaturation and consisting essentially of an aromatic olefinic liquid petroleum fraction having an approximate boiling point in the range of about 450 to 560° C., a vinyl benzene, cyclohexene, vinyl acetate, methyl oleate, linseed oil, soya oil, oleic acid, linseed oil fatty acids, the reaction product of a polycarboxylic acid and a polyhydric alcohol, a butadiene-styrene copolymer, a lower mono-isoolefine-diolefine copolymer, a lower unsaturated nitrile-diolefine copolymer and a natural rubber, comprising contacting said olefinic unsaturated compound under reaction conditions with a hydantoin compound of the group consisting of 1,3-N-N'-bromo-chloro 5-hydrocarbon substituted hydantoins and mixtures of 1,3-N-N'-dichloro-5-hydrocarbon substituted hydantoins with 1,3-N-N'-dibromo-5-hydrocarbon substituted hydantoins.

14. The adduct of a 1,3-N-N'-bromo-chloro-5-hydrocarbon substituted hydantoin with the ethylenic double bond of an isobutylene-butadiene copolymer.

References Cited in the file of this patent

UNITED STATES PATENTS

| | | |
|---|---|---|
| 2,291,574 | Gleason et al. | July 28, 1942 |
| 2,327,517 | Frolich et al. | Aug. 24, 1943 |
| 2,430,233 | Mazie | Nov. 4, 1947 |
| 2,779,764 | Peterson | Jan. 29, 1957 |
| 2,804,448 | Hallenbeck | Aug. 27, 1957 |
| 2,816,098 | Morrissey | Dec. 10, 1957 |

OTHER REFERENCES

Orazi et al.: Chem. Abst., vol. 44, column 5829 (1950).
Orazi et al.: Chem. Abst., vol. 44, column 7778 (1950).
Salellas et al.: Chem. Abs. 45, p. 2873 (1951).
Orazi et al.: Chem. Abst., vol. 47, column 3244 (1953).